(12) United States Patent
Inglese et al.

(10) Patent No.: US 7,704,314 B2
(45) Date of Patent: Apr. 27, 2010

(54) CONCRETE PUMP PRIMER

(75) Inventors: Pat Inglese, 3961 Glenhurst Dr., Smyrna, GA (US) 30080; David Ray Hurst, Jefferson, GA (US)

(73) Assignee: Pat Inglese, Smyrna, GA (US)

( * ) Notice: Subject to any disclaimer, the term of this patent is extended or adjusted under 35 U.S.C. 154(b) by 971 days.

(21) Appl. No.: 10/584,673

(22) PCT Filed: Jan. 19, 2005

(86) PCT No.: PCT/US2005/001980

§ 371 (c)(1),
(2), (4) Date: Jun. 26, 2006

(87) PCT Pub. No.: WO2005/073556

PCT Pub. Date: Aug. 11, 2005

(65) Prior Publication Data

US 2009/0104043 A1    Apr. 23, 2009

Related U.S. Application Data

(60) Provisional application No. 60/537,701, filed on Jan. 20, 2004.

(51) Int. Cl.
C09D 7/00      (2006.01)
C04B 24/12    (2006.01)
C08L 75/00    (2006.01)

(52) U.S. Cl. .................. 106/287.35; 106/804; 106/805; 417/53; 417/54; 524/589; 524/591

(58) Field of Classification Search .................. 106/804, 106/805; 417/53, 54; 524/589, 591
See application file for complete search history.

(56) References Cited

U.S. PATENT DOCUMENTS

| | | | | |
|---|---|---|---|---|
| 4,268,547 | A | * | 5/1981 | Backhouse ............... 427/385.5 |
| 5,318,408 | A | | 6/1994 | Davidsson |
| 5,443,636 | A | | 8/1995 | Montgomery |
| 5,587,012 | A | | 12/1996 | Montgomery |
| 5,683,503 | A | | 11/1997 | Montgomery |
| 5,997,633 | A | | 12/1999 | Montgomery |

* cited by examiner

*Primary Examiner*—Melvin C Mayes
*Assistant Examiner*—Joseph V Micali
(74) *Attorney, Agent, or Firm*—Gardner Groff Greenwald & Villanueva, PC

(57) ABSTRACT

An improved composition for and method of priming a concrete pump line is provided. The flowable composition comprises a solid particulate mixture and water, the particulate mixture being comprised of solvatable polymeric material preferably selected from a group consisting of polyacrylamide, polyacrylate and mixtures thereof; an organic complexing agent preferably of urea; and a buffering agent preferably of citric acid. The invention provides a flowable composition exhibiting improved coating and lubrication to the inner walls of a concrete line as it passes therethrough. The flowable composition mixes quickly with water to form a clear solution, hydrates quickly upon being mixed with water, and provides a composition for use in priming concrete pump lines that does not utilize cement or priming grout slurry.

6 Claims, No Drawings

CONCRETE PUMP PRIMER

CROSS REFERENCE TO RELATED APPLICATIONS

This application is the US national phase of PCT application PCT/US2005/01980 filed Jan. 19, 2005 with a claim to the priority of U.S. provisional patent application 60/537,701 filed Jan. 20, 2004.

FIELD OF THE INVENTION

The present invention relates generally to the field of concrete pumping for commercial, highway, industrial and residential construction projects; and more particularly to the field of priming concrete pumps and lines. In greater particularity, the present invention relates to compositions for and methods of priming concrete pumps and lines.

BACKGROUND OF THE INVENTION

The placement of concrete into forms is a critical phase of most commercial, highway, industrial and residential construction projects. Typically, construction contractors are required to place concrete into forms as soon as possible after mixing, while the concrete is in a plastic and workable state. In many projects it is also required that concrete placement be continuous to allow for appropriate consolidation of adjoining layers to allow formation of uniform, dense, impervious concrete with smooth faces on exposed surfaces. The failure to properly place concrete in conformance with such exacting standards can result in structurally defective concrete that in many instances must be replaced at great cost to the construction contractor.

The use of concrete pumps for the placement of concrete into forms has gained widespread acceptance as a safe, efficient, and cost effective method of concrete placement. Concrete pumping allows for direct placement of concrete into forms without rehandling, resulting in significantly reduced labor costs and improved concrete quality. Generally, the use of concrete pumps is faster than traditional methods, because pumping allows for continuous placement of concrete. This can increase the productivity of finishers and decrease total construction time for the overall project, minimizing overhead costs and monetary penalties associated with construction delays.

Placement of concrete utilizing the pumping method involves the flow of concrete from a pump through a conduit, or pump line, such as flexible hoses or metal pipe. Concrete exits the pump line in a precisely controlled manner directly into forms. Pumping concrete offers a steady, predictable flow of concrete delivered to the point-of-use resulting in a smooth-flowing operation. A significant concern in concrete pumping operations is ensuring that the inner, concrete-contacting surfaces of the pump line are lubricated to facilitate the flow of concrete therethrough. This is not a problem after the flow of concrete has been established, because as it passes through a pump line the concrete acts as a self-lubricating agent by leaving a layer of slick cement slurry on the inner walls of the pump line. This is a problem, however, in initially establishing concrete flow in a pump line. Attempting to pump concrete through a dry pump line will cause the pump line to plug, resulting in costly construction delays. To address this problem, concrete pumpers have traditionally added water to the first batch of concrete to allow it to pump easier. This conventional, "just wetting" technique is unacceptable because in most cases it does not prevent the pump line from plugging. Further, the introduction of excess water into the mixed concrete alters the target water-cement ratio of the concrete, causing decreased strength of the finished concrete and segregation of the components of the concrete. To address the problem, the American Concrete Pumping Association recommends always priming a concrete pump and line prior to initiating concrete pumping.

Priming a concrete pump line involves the application of a lubricating agent to the inner walls of the pump line to promote the establishment of concrete flow through the line. This is typically accomplished by pumping a priming fluid through the pump line immediately prior to initiating the pumping and flow of concrete through the pump line. The priming fluid is of a type that is easily pumped through a dry concrete pump line, and that will lubricate the inner, concrete-contacting surfaces of the pump line as it is pumped therethrough. In practice, the priming fluid once prepared is placed in fluid communication with the suction side of a concrete pump. In practice, the priming fluid is often placed in a vessel, referred to as a hopper, that is in fluid communication with the concrete pump. As the priming fluid is being pumped from the hopper, concrete is typically added to the hopper such that the final portion of the priming fluid is in contact with the initial portion of the concrete, with the priming fluid thereby preceding the concrete that is pumped through the concrete pump line. The priming fluid acts to lubricate the inner, concrete-contacting surfaces of the concrete pump line to facilitate the initial movement of concrete therethrough.

Various compositions for priming concrete pumps and pump lines are known in the prior art, however, all are disadvantageous when compared to the present invention. For instance, one method of priming concrete pumps utilizes ready-mixed priming grout. This priming grout slurry has the disadvantage of being expensive, requiring the use of a ready-mix truck. This method also has the disadvantage of utilizing large volumes of priming grout slurry that cannot be mixed with concrete, i.e., added to the form and mixed with concrete. This method therefore produces a large volume of priming grout slurry waste that requires offsite disposal. Another method of priming concrete pumps utilizes a concrete priming slurry, consisting of cement and water. Although the concrete priming slurry may be prepared without the use of a ready-mix truck, this concrete priming slurry method has the disadvantage of requiring the onsite delivery and handling of extra bags of cement. Additionally, similar to the priming grout slurry, the concrete priming slurry is a waste that requires offsite disposal.

The prior art also teaches the use of specialized lubricants as a priming fluid. For instance, U.S. Pat. No. 5,997,633 to Montgomery teaches the use of a priming fluid comprising an additive mixed with water, the additive having a composition by weight of 80 to 90 percent alkaline material and 10 to 20 percent polymeric material. Such a priming fluid presents disadvantages, as the strongly alkaline nature of the priming fluid, having a pH of between 11 and 12, presents safety concerns associated with the handling of the priming fluid. Further, the strongly alkaline nature of the priming fluid increases the risk of producing weak or unstable set concrete as a result of alkali-silica reactivity and alkali-aggregate reactivity. Other disadvantages with the use of alkaline priming fluid are associated with the cost of the alkaline materials and the relatively long duration of additive mixing and hydration. The use of the priming fluid prior to full hydration presents the risk of drawing water from concrete as it passes through a pump line, which interferes with the desired lubricating effect of the priming aid.

U.S. Pat. No. 5,318,408 to Davidsson teaches the use of an aqueous suspension, in contrast to an aqueous solution, as a concrete priming fluid. This reference discloses the use of an aqueous suspension comprising amorphous silica, namely silica fume, and a water dispersable polymer consisting of vinyl esters, acrylic acid esters, styrene, butadiene, and vinyl-halogen compounds. The use of such suspensions instead of aqueous solutions as a priming fluid presents several disadvantages. For instance, the suspension becomes unpumpable if subjected to pumping pressures higher then the segregation pressure required to separate the solids and liquids in the suspension. Therefore, the user must carefully monitor the pumping pressure to ensure that it does not exceed the suspension's segregation pressure. Further, the limitation of using water dispersable polymers provides a pump primer having inferior lubricating properties. Other disadvantages with the use of an aqueous suspension are associated with the difficulty of maintaining a uniform suspension during use, which interferes with the lubricating effect of the pumping aid.

Accordingly, it is recognized in the construction industry that there is an increasing need for improved compositions for and methods of priming a concrete pump line to lubricate the pump line to promote the initial flow of concrete through the line. The present invention addresses the need for improved compositions for use in priming concrete pump lines in commercial, highway, industrial and residential construction projects

SUMMARY OF THE INVENTION

It is the object of the present invention to provide an improved composition for use in priming concrete pump lines.

Another object of the present invention is to provide a solid particulate mixture that mixes quickly with water to produce an improved fluid composition for use in priming concrete pump lines.

An additional object of the present invention is to provide a solid particulate mixture that hydrates quickly upon mixing with water to minimize drawing water from concrete after the fluid composition has been used in priming concrete pump lines.

A still further object of the present invention is to provide a fluid composition that provides improved coating and lubrication to the inner walls of a concrete pump line as it passes therethrough during priming.

Another object of the present invention is to provide a clear aqueous solution for use in priming concrete pump lines.

An additional object of the present invention is to provide a fluid composition for use in priming concrete pump lines that does not utilize cement or priming grout slurry.

These and other objects of the present invention are accomplished through an improved flowable composition for use in priming a concrete pump line. The flowable composition comprises a solid particulate mixture and water, the particulate mixture being comprised of solvatable polymeric material and urea. The present invention provides a specialized lubricant agent for use in concrete pump priming having a balanced or slightly alkaline pH, thereby overcoming the disadvantages of highly alkaline lubricants known in the art.

The flowable composition of the present invention comprises solvatable polymeric material in an amount in the range of from about 2 percent to about 50 percent by weight of said mixture and urea in an amount in the range of from about 50 percent to about 98 percent by weight of said mixture. Preferably, the polymeric material is in an amount in the range of from about 10 percent to about 20 percent by weight of said mixture and urea in an amount in the range of from about 80 percent to about 90 percent by weight of said mixture. The quantity of water in the flowable composition is at least an amount in the range of about 0.01 to about 1.0 pounds of mixture per gallon of water, preferably in the range of about 0.05 to about 0.25 pounds of mixture per gallon of water.

The present invention overcomes the limitations of the prior art by providing a priming agent that mixes quickly to form a clear flowable priming solution that is easy to pump through dry concrete pump lines to lubricate the inner walls thereof. After mixing for only four to nine minutes, and optimally within five minutes, the flowable composition of the present invention reaches and maintains its maximum lubricating potential. The short mix time exhibited by the present invention reduces delays associated with priming a concrete pump line, and allows the priming agent to be prepared shortly before use. Unlike specialized lubricating agents known in the prior art that utilize strongly alkaline materials that must be dissolved in the mixing process prior to use, the mixing duration of the present invention is enhanced by the presence of urea.

A further advantage of the present invention is that the particulate mixture hydrates more quickly upon being mixed with water than alkaline additives known in the prior art. Upon mixing the particulate mixture of the present invention with water, the composition reaches its proper lubricating viscosity and stabilizes to full hydration within a period of four to nine minutes, optimally less than five minutes. Unlike specialized lubricating agents known in the art, the composition does not continue to thicken or hydrate after an optimal five-minute duration after mixing. As with the mix time, the short hydration time exhibited by the present invention reduces delays associated with priming a concrete pump line, and allows the priming agent to be prepared shortly before use. Also important, the short hydration time reduces the risk of using the priming fluid prior to full hydration, which increases the risk of inadequate lubrication of a concrete pump line. Instead of acting to lubricate a pump line, a priming fluid that has not been fully hydrated prior to use would have the opposite effect. A concrete pump primer that has not been fully hydrated would draw water from concrete as it passes through a pump line. This causes a drying effect on the concrete that separates the cement and aggregate components of the concrete and increases the risk of plugging the concrete pump line. Because the present invention hydrates more quickly than specialized lubricants known in the prior art, the present invention will not draw water from or otherwise dry out concrete. On account of the improved rheological properties of the present invention, it is suitable for use as a priming agent on longer pump lines and with more difficult concrete mixes.

Another advantage of the present invention is that, through the use of chemically-inert urea as a complexing agent, the flowable composition is a priming agent that has a significantly more balanced pH. The use of the present invention, unlike priming agents known in the prior art, avoids problems associated with the use of highly alkaline priming agents. In comparison to those priming agents, the present invention is less-alkaline and therefore safer to handle. The present invention has the further advantages of preventing contact between a highly alkaline material and concrete or form structures, reducing the risk of damaging form structures such as rebar, and the risk of producing weak or unstable set concrete as a result of alkali-silica reactivity or alkali-aggregate reactivity.

Several additional advantages of the present invention arise from the use of urea, which is an organic, highly water soluble compound that is widely used as a nitrogen fertilizer. Urea is the most commonly used dry nitrogen fertilizer because compared to other such fertilizers it is less expensive, safer to ship and handle, and less corrosive to equipment. In the present invention, the use of urea allows the priming aid to be maintained in a clear solution with a uniform viscosity. In comparison to the highly alkaline inorganic components in priming agents known in the art, the use of urea results in a priming solution that is far less alkaline. Therefore, the use of urea does not deleteriously effect the structure of the polymer component, such as precipitation. The use of urea as a complexing agent, which binds with metals in solution such as calcium and magnesium ions in cement and inhibits precipitation, ensures that the viscosity of the polymer component is not adversely effected by the high calcium and magnesium ion content of cement. Another advantage is that it is easier to control the pH of the priming aid using a buffering agent. Additionally, the use of urea provides a priming aid that is inherently environmentally safer to dispose in comparison to priming aids taught in the prior art. Urea can be directly applied to land and utilized as a nitrogen fertilizer for virtually all types of vegetation.

These and other objects and advantages of the invention will become apparent from the following detailed description of the preferred embodiment of the invention.

DESCRIPTION OF THE PREFERRED EMBODIMENT

The present invention provides improved compositions and methods for priming a concrete pump line. The method of priming a concrete pump line comprises the steps of providing a solid particulate mixture comprised of solvatable polymeric material and urea; mixing the solid particulate mixture with a sufficient quantity of water to form a flowable composition; and pumping the flowable composition through a concrete pump line.

In the preferred embodiment of the method of priming a concrete pump line, the solid particulate mixture comprises solvatable polymeric material in an amount in the range of from about 2 percent to about 50 percent by weight of the mixture and urea in an amount in the range of from about 50 percent to about 98 percent by weight of the mixture. Preferably, the solid particulate mixture comprises solvatable polymeric material in an amount in the range of from about 10 percent to about 20 percent by weight of the mixture and urea in an amount in the range of from about 80 percent to about 90 percent by weight of the mixture.

The solvatable polymeric material includes a wide variety of polymers that either dissolve in water or at least form a colloidal dispersion in water. The solvatable, organic polymeric material as described herein may be a single polymer or copolymer or a mixture of such polymers and/or copolymers. Examples of polymers and copolymers useful in the present invention include polyethylene oxide, polypropylene oxide, polyacrylate, polymethacrylate, polyacrylamide, polymethacrylamide and copolymers thereof, maleic anhydride/methylvinyl ether copolymers, polyvinyl alcohol, polyvinylpyrrolidone, polyvinylacetate, copolymers of acrylamide and 2-acrylamido, 2-methylpropane sulfonic acid and copolymers of N,N-dimethylacrylamide and 2-acrylamido, 2-methylpropane sulfonic acid, guar gum, locust bean gum, karaya gum, carboxymethylguar, hydroxyethylguar, hydroxypropylguar, carboxymethylhydroxyethylguar, carboxymethylhydroxy-propylguar, carboxymethylcellulose, carboxymethylhydroxyethylcellulose, carboxymethylcellulose, hydroxyethylcellulose, hydroxyethylcellulose, cellulose ethers, starches, alginates and carrageenans. Further examples of polymers and copolymers useful in the present invention include polysaccharides, galactomannan gums, glucomannan gums, cellulose derivatives, and cellulose, galactomannan or glucomannan gums that have been modified by reaction with hydrophilic constituents including hydroxyalkyl groups, carboxyalkyl groups and mixed hydroxyalkyl and carboxyalkyl groups to form ether derivatives. Other hyrdophilic constituent groups include cis-hydroxyl, hydroxyl, carboxyl, sulfate, sulfonate, amino and amide groups.

As noted, the solvatable polymeric material useful in the method of priming a concrete pump line described herein can be either a single polymer or copolymer; or a mixture of polymers and copolymers. In the preferred embodiment, the solvatable polymeric material is selected from a group consisting of polyacrylamide, polyacrylate and mixtures thereof; preferably in an amount greater than about 80 percent by weight of the polymeric material and polyacrylate in an amount less than about 20 percent by weight of the polymeric material. The most preferred composition of the polymeric material comprises a mixture of polyacrylamide and copolymer of polyacrylamide and polyacrylate wherein the weight ratio of polyacrylamide polymer to polyacrylamide/polyacrylate copolymer is about 9 to 1.

In addition to solvatable polymeric material, the solid particulate mixture of the present invention further comprises urea. Urea is a white crystalline organic substance that is highly water soluble. It is widely used as a dry nitrogen fertilizer on account of its high nitrogen concentration of 46 weight percent. Urea is a generally neutral molecule that readily dissolves in water to form an aqueous solution that is only slight alkaline (pH of between 7.0 and 8.5). Commercial urea is processed through the evaporation and granulation of urea solution into either prills or granules. Granular urea is somewhat larger in size than prills. In granular form, urea is a dry product with a Size Guide Number (SGN) of approximately 260 to 270. In the preferred embodiment, urea has a particle size distribution typical of that commercially available in granular form.

The method of priming a concrete pump line of the present invention includes the steps of providing a solid particulate mixture comprised of solvatable polymeric material and urea, and mixing the solid particulate mixture with a sufficient quantity of water to form a flowable composition. The invention also provides pumping the flowable composition through a concrete pump line. It is contemplated that the quantity of water in the flowable composition being herein described as sufficient, shall be in the range of about 0.01 to about 1.0 pounds of mixture per gallon of water, preferably in the range of about 0.05 to about 0.25 pounds of mixture per gallon of water. In the preferred embodiment, the quantity of water in the flowable composition is about 0.1 pound of mixture per gallon of water. This is generally equivalent to mixing an amount of 0.5 lbs (8 oz.) of solid particulate mixture in five gallons of water.

The solid particulate mixture of the present invention may further comprise a buffering agent, preferably citric acid. The buffering agent may be present in the solid particulate mixture in an amount in the range of from about 0.01 to about 5.0 percent. With the use of a buffering agent, which is the preferred embodiment of the present invention, the solid particulate mixture comprises urea in an amount of about 84.5 weight percent of particulate mixture, solvatable polymeric material in an amount of about 15 weight percent of particulate mixture, and a buffering agent in an amount of about 0.5 weight percent of particulate mixture. The buffering agent provides a means of adjusting the pH of the flowable priming composition to as close to neutral pH of 7.0 as desired.

The present invention further provides an improved method of making a flowable composition for use in priming a concrete pump line, the method comprising the step of mixing solid particulate material with water as described herein, wherein the mixture comprises solvatable polymeric material and urea.

The present invention also provides an improved solid particulate mixture that when mixed with a sufficient quantity of water forms a flowable composition useful in priming a concrete pump line, wherein the solid particulate mixture comprises solvatable polymeric material and urea as described herein.

It may be appreciated that the present invention provides an improved flowable composition for use in priming a concrete pump line. The improved flowable composition is comprised of a solid particulate mixture and water as described herein, wherein the mixture comprises solvatable polymeric material and urea.

It may be appreciated that the present invention provides a specialized lubricant agent for use in concrete pump priming having a generally balanced pH, unlike the highly alkaline lubricants for concrete pump priming known in the art. Further, the present invention provides a priming agent that mixes quickly to form a clear priming solution that is easy to pump through dry concrete pump lines to lubricate the inner walls thereof.

Testing of the preferred embodiment indicates that after mixing for between four and nine minutes, and optimally less than five minutes, the flowable composition reaches and maintains its maximum lubricating potential. The short mix time exhibited by the preferred embodiment of the present invention reduces delays associated with priming a concrete pump line, and allows the priming agent to be prepared shortly before use.

Unlike specialized lubricating agents known in the prior art, the present invention does not utilize strongly alkaline materials or other chemical modifiers that must be dissolved prior to use, thereby increasing the mix time. Mixing to form the flowable composition is further enhanced by an organic complexing agent for the polymeric material, namely, urea. The present invention exhibits reduced mix times, providing advantages over prior art lubricating agents for construction crews.

Tests indicate an additional advantage of the present invention is provided in a shorter time required for hydration of the particulate mixture upon being mixed with water. Unlike specialized lubricating agents known in the art, the composition does not continue to thicken or hydrate after an optimal five-minute duration after mixing. The short hydration time exhibited by the present invention reduces delays associated with priming a concrete pump line, and allows the priming agent to be prepared shortly before use. Also an important advantage of the present invention over lubricating agents known in the art, the short hydration time reduces the risk of using a priming fluid prior to full hydration, which could result in a failure to adequately lubricate a concrete pump line. Instead of lubricating a pump line, a priming fluid that has not fully hydrated would draw water from concrete as it passes through a pump line. This drying effect on concrete reduces the effectiveness of the priming agent as a lubricant, and may lead to plugging of a concrete pump line. Because the present invention hydrates more quickly than specialized lubricants known in the prior art, the present invention will not draw water from or otherwise dry out concrete. On account of this characteristic of the present invention, the present invention is suitable for use as a priming agent on longer pump lines and with more difficult concrete mixes.

Another advantage of the present invention is that, through the use of urea as a complexing agent, namely, an organic compound which binds with metals in solution such as calcium and magnesium ions in cement and inhibits precipitation, provides a priming agent that has a generally balanced pH. The use of the present invention, unlike priming agents known in the prior art, avoids problems associated with the use of highly alkaline priming agents. In comparison to those priming agents, the present invention is non-alkaline and therefore safer to handle. The present invention has the further advantages of preventing contact between a highly alkaline material and concrete or form structures. This reduces the risk of damaging form structures such as rebar, and the risk of producing weak or unstable set concrete as a result of alkali-silica reactivity or alkali-aggregate reactivity.

It is to be understood that the form of the invention shown is a preferred embodiment thereof and that various changes and modifications may be made therein without departing from the spirit of the invention or scope as defined in the following claims.

The invention claim is:

1. A method of priming a concrete pump line, said method comprising the steps of:
    providing a solid particulate mixture comprised of solvatable polymeric material in an amount in the range of from about 2 percent to about 50 percent by weight of said mixture and urea in an amount in the range of from about 50 percent to about 98 percent by weight of said mixture;
    mixing said solid particulate mixture with a sufficient quantity of water to form a flowable composition; and
    pumping said flowable composition through a concrete pump line.

2. A method of priming a concrete pump line as described in claim 1 wherein said polymeric material comprises solvatable polymeric material in an amount in the range of from about 10 percent to about 20 percent by weight of said mixture and urea in an amount in the range of from about 80 percent to about 90 percent by weight of said mixture.

3. A method of priming a concrete pump line as described in claim 2 wherein said polymeric material is selected from a group consisting of polyacrylamide, polyacrylate, copolymers of polyacrylamide and polyacrylate, and mixtures thereof.

4. A method of priming a concrete pump line as described in claim 3 wherein said polymeric material comprises polyacrylamide in an amount greater than about 80 percent by weight of said polymeric material and a copolymer of polyacrylate and polyacrylamide in an amount less than about 20 percent by weight of said polymeric material.

5. A method of priming a concrete pump line as described in claim 1 wherein said mixture comprises a buffering agent.

6. A method of priming a concrete pump line as described in claim 5 wherein said buffering agent comprises citric acid.

* * * * *